United States Patent [19]

Cataldie, Jr.

[11] Patent Number: 5,441,377
[45] Date of Patent: Aug. 15, 1995

[54] SELF UNLOADING HAY HAULING APPARATUS

[76] Inventor: Sam V. Cataldie, Jr., 5221 Lark La., Alexandria, La. 71303

[21] Appl. No.: 342,307

[22] Filed: Nov. 18, 1994

[51] Int. Cl.⁶ .............................................. B60P 1/48
[52] U.S. Cl. .................................. 414/437; 414/24.5; 414/509
[58] Field of Search ............ 414/434, 437, 509, 24.5, 414/111, 911

[56] References Cited

U.S. PATENT DOCUMENTS

| | | | |
|---|---|---|---|
| 2,965,251 | 12/1960 | Ganahl | 414/509 X |
| 3,922,036 | 11/1975 | Kalsbeck et al. | 414/24.5 X |
| 4,089,425 | 5/1978 | Baltz | 414/24.5 |
| 4,415,300 | 11/1983 | Boddicker | 414/24.5 |
| 5,071,304 | 12/1991 | Godfrey | 414/24.5 X |
| 5,362,189 | 11/1994 | Lindahl | 414/24.5 |

Primary Examiner—Michael S. Huppert
Assistant Examiner—James Eller
Attorney, Agent, or Firm—Rodney Bryant Jordan

[57] ABSTRACT

An apparatus, or trailer, for use in transporting large bales of hay in which the bales are loaded onto two rails from the rear of the trailer and slid forward. Upon unloading, the bales are pushed backward off the trailer as the trailer is pulled forward by a pushing mechanism which is mounted by way of wheels onto a track which runs down each side of the trailer. The pushing mechanism is extended until it is forced against the ground. Upward pressure is exerted upon the rails by a set of wheels which are located below the rails. These wheels roll along the lower side of the track as the pushing mechanism pushes the bales off the rear of the moving trailer. After unloading, the pushing mechanism is retracted from the ground and may be rolled forward on wheels that are located above the tracks.

4 Claims, 2 Drawing Sheets

SELF UNLOADING HAY HAULING APPARATUS

BACKGROUND OF THE INVENTION

The invention, as described herein, comprises an apparatus for transporting the large, round bales of hay that are commonly rolled and stored on today's farms. The recent advent of large bale hay balers has virtually put an end to the method of transporting hay and storing it in barns by loading small bales onto trucks. Today's hay bales employ their great bulk as a method of storage by using the thin outer layer of each bale as a shield against moisture thereby protecting the bulky interior. This allows for the outside storage of hay similar to the old hay stack method, however, these modern haystacks often must be transported themselves. The invention, as described herein, will provide a method of transporting these bales.

DESCRIPTION OF THE PRIOR ART

Usually the bales are loaded on and off of large trailers by a fork lift of some kind, or transported one at a time by a tractor equipped with a fork for lifting. The first method requires that a lift be present at both the loading and unloading sites. The latter method requires excessive time and fuel. The invention, as described herein, will provide for a method of transporting large bales which avoids both of these problems.

SUMMARY OF THE INVENTION

The self unloading hay hauling apparatus comprises a trailer which is equipped with a skid running along each side on which bales are placed from the rear of the apparatus. The two skids constitute the actual bed of the trailer. As each successive bale is loaded the previous bale is slid further toward the front of the trailer. The trailer is equipped with an "H" shaped track on either side. A base support platform is mounted to the track by being attached to an arrangement of wheels that are fitted above and below each track so that when the trailer's forward section is supported by the trailer hitch of the vehicle being employed to pull the load, the base support platform may easily be moved from front to back, and vice versa, by way of the wheels rolling along the track. As the bales are loaded the base support platform will be pushed toward the forward end of the trailer. The base support platform can be lowered to unhitch the trailer by way of a manual or hydraulic jack which is attached to the base support platform. The trailer's tongue is jointed so that it may buckle upon the removal of a tongue stabilizing pin. By lowering the base support platform, after removal of the pin, the weight of the front end of the trailer is placed upon the base support platform without unhitching the trailer from the vehicle. The weight of the front end of the trailer is thus transferred to the lower wheels of the wheel and track arrangement and the contact of the foot of the base support platform with the ground. As the vehicle is driven forward two support posts which rise from the base support platform and extend above the bales will shove the entire line of bales off of the rear end of the trailer leaving them in the exact space where the trailer was positioned. After unloading, the base support platform is again raised leaving the weight of the base support platform to be born by the upper wheels of the wheel and track arrangement and the weight of the forward end of the trailer upon the trailer hitch. The tongue stabilizer pin is replaced and the base support platform is free to be pushed toward the front of the trailer as more bales are loaded.

BRIEF DESCRIPTION OF THE DRAWINGS

FIG. one is a side elevation view of the self unloading hay hauling apparatus being unloaded.

FIG. two is a top elevation view of the self unloading hay hauling apparatus.

DETAILED DESCRIPTION OF THE INVENTION

Figure 1:
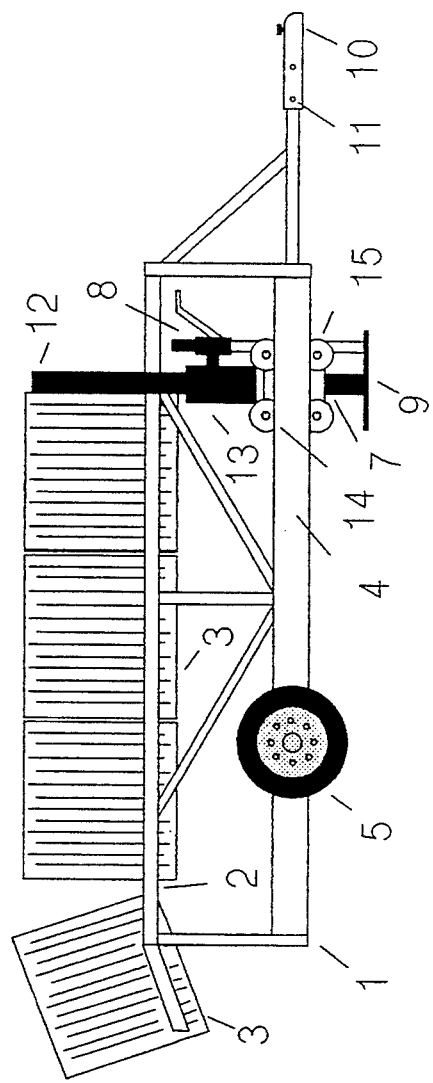
Figure 2:
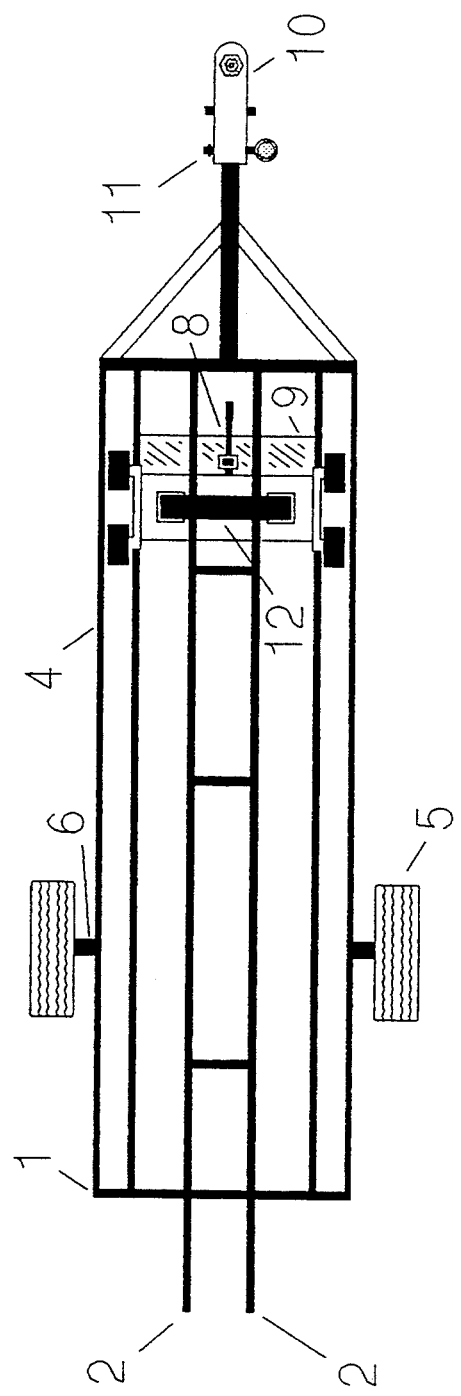

Referring to the drawings it can be seen that a trailer 1 is equipped with two rails 2 on which bales 3 are situated in line with the length of the trailer 1. A track 4, which generally takes the form of an "H" beam, is located along both sides of the trailer 1 and forms the lower member of the body of the trailer 1. Wheels 5 are attached to tracks 4 by axles 6. These wheels 5 extend away from tracks 4 so as not to interfere with the operation of the unloading mechanism 7.

As bales 3 are loaded onto rails 2 from the rear of trailer 1, unloading mechanism 7 is pushed toward the forward end of trailer 1 until trailer 1 is completely loaded. In order to unload the trailer, jack 8 is employed to force base 9 of unloading mechanism 7 toward the ground until the forward end of trailer 1 is supported by base 9 rather than trailer tongue 10. Unloading mechanism 7 consists of base 9, support posts 11, cross brace 12, housings 13, jack 8, upper wheels 14 and lower wheels 15. Support posts 11 traverse housings 13. Housings 13 are mounted to tracks 4 by upper wheels 14 and lower wheels 15 which are located above and below tracks 4. In order to unload the trailer 1, jack 8, which is affixed at its upper end to housing 13, and at its lower end to base 9, is employed to force base 9 of unloading mechanism 7 toward the ground until the forward end of trailer 1 is supported by base 9 rather than trailer tongue 10. Trailer 1 is then pulled forward. Tongue stabilizer pin 11 is removed so that tongue 10 may buckle in order to accommodate the rise and fall of the terrain as trailer 1 is pulled forward. The weight of unloading mechanism 7 is supported by upper wheels 14 during loading and hauling. As base 9 is forced to the ground the weight of trailer 1 is born by trailer wheels 5 and lower wheels 15 which move along the lower groove of tracks 4. The friction between the ground and base 9 holds unloading mechanism 7 in place as trailer 1 is pulled forward. Bales 3 are pushed of the rear of trailer 1 by support post 11 and cross brace 12. As bales 3 are forced off trailer 1 they are left lying in the area where trailer 1 was parked as unloading began. This allows for quick, easy, one man unloading in confined areas.

I claim:

1. An apparatus for hauling large bales of hay comprising a trailer, said trailer further comprising:
   a frame comprising a front end, a rear end, and an "H" beam track;
   a plurality of wheels affixed to said track;
   a tongue comprising a forward end, a rearward end and a midsection, said tongue having a joint so as to pivot vertically at said midsection, said joint further comprising a pin, wherein removal of said pin is necessary for said joint to pivot;
   a hay supporting member comprising a pair of rails, said rails being mounted linearly above said frame so as to accommodate loading of said bales from said rear end of said trailer; and a hay unloading mechanism comprising a set of supporting wheels, and a rearward pushing member, said rearward pushing member further comprising two support posts, each of said support post being positioned vertically and adjacent to said rails, each support post traversing a housing, said support posts having an upper and lower end, said housing being affixed to said support wheels, a base, said base being affixed to said lower ends of said support post perpendicular to said frame of said trailer, said base being rectangular in shape, a cross brace, said cross brace being affixed across and to said upper ends of said support posts so as to contact said hay, a lifting mechanism, said lifting mechanism having an upper and a lower end, said upper end of said lifting mechanism being affixed to said housing, and said lower end of said lifting mechanism being affixed to said base, said support wheels further comprising two sets of upper wheels and two sets of lower wheels, said "H" beam track further comprising upper and lower tracks, said upper wheels so affixed to said housing as to ride along said upper tracks of said "H" beam track so as to support the weight of said base above the ground so that said unloading mechanism may be adjusted from said front to said rear of said trailer being rolled along said track on said upper wheels, and said lower wheels being so affixed to said housing so as to ride along said lower track of said rail so as to support the weight of said trailer when said base is lowered, thereby allowing said trailer to be moved forward as said unloading mechanism remains in place so as to cause said bales to be pushed off said rear end of said trailer by said cross brace and said support posts so as to unload said bales in a row along the length of said trailer.

2. An apparatus as recited in claim 1, wherein said base is tilted forward so as to dig into place as said trailer is pulled forward.

3. An apparatus as recited in claim 2, wherein said lifting mechanism comprises a manual jack.

4. An apparatus as recited in claim 3, wherein said lifting mechanism further comprises a motorized jack.

* * * * *